United States Patent

Windey et al.

Patent Number: 6,135,594
Date of Patent: *Oct. 24, 2000

[54] TORIC CONTACT LENS WITH AXIS OFFSET COMPENSATION AND METHOD AND APPARATUS FOR MANUFACTURING SAME

[75] Inventors: Jan Windey; Susan Neadle, both of Jacksonville; Derek Smith, Jax, all of Fla.

[73] Assignee: Johnson & Johnson Vision Care, Inc., Jacksonville, Fla.

[*] Notice: This patent is subject to a terminal disclaimer.

[21] Appl. No.: 09/217,364

[22] Filed: Dec. 21, 1998

[51] Int. Cl.$^7$ ............................................. G02C 7/04
[52] U.S. Cl. ...................... 351/160 H; 351/177; 425/555
[58] Field of Search ........................... 351/160 R, 160 H, 351/161, 162, 177; 425/555, 808

[56] References Cited

U.S. PATENT DOCUMENTS

| | | | |
|---|---|---|---|
| 4,153,349 | 5/1979 | Wichterle | 351/160 H |
| 4,208,364 | 6/1980 | Shepherd | 264/1 |
| 4,573,774 | 3/1986 | Sitterle | 351/160 H |
| 4,573,903 | 3/1986 | Boudet et al. | 425/555 |
| 5,650,837 | 7/1997 | Roffman et al. | 351/161 |
| 5,652,638 | 7/1997 | Roffman et al. | 351/161 |
| 5,988,813 | 11/1999 | Neadle et al. | 351/177 |

FOREIGN PATENT DOCUMENTS

| | | |
|---|---|---|
| 0 051 027 | 5/1982 | European Pat. Off. |
| 0 561 481 | 9/1993 | European Pat. Off. |

*Primary Examiner*—Scott J. Sugarman

[57] ABSTRACT

A contact lens and a method and apparatus for manufacturing a contact lens having areas of different thickness, the contact lens being compensated for differential shrinkage during the manufacturing process. The angular offset of the cylinder axis due to differential shrinkage is compensated for by introducing an equal and opposite offset during the manufacturing process. The axis offset caused by a particular manufacturing process is experimentally determined, i.e., for each intended cylinder axis, the corresponding offset (in terms of degrees of rotation) is determined. The lens compensation is implemented by adjusting the manufacturing process so that upon curing the lens corresponds to the desired, prescribed lens, without any axis offset.

17 Claims, 3 Drawing Sheets

TORIC CONTACT LENS WITH AXIS OFFSET COMPENSATION AND METHOD AND APPARATUS FOR MANUFACTURING SAME

FIELD OF THE INVENTION

The present invention relates to a toric contact lens which is compensated for axis offset due to differential shrinkage, as well as a method and apparatus for manufacturing such lens.

BACKGROUND OF THE INVENTION

Contact lenses are generally used to correct various types of vision problems. See, for example, U.S. Pat. Nos. 4,573,774, 5,650,837, and 5,652,638, which are incorporated herein in their entireties by reference. Also, various texts discuss the principles of contact lens design and manufacturing: Ruben et al., Contact Lens Practice (Chapman & Hall, London); is Stein, Slatt & Stein, Opthalmic Terminology (C.V. Mosby Company, St. Louis, 1987), which are also incorporated herein by reference.

Astigmatism occurs when a portion of the eye focuses light at a different focal point than the rest of the eye, i.e., it is a refractive error of the eye in which the rays of light do not come to a single point focus on the retina. Toric lenses, or lenses with cylinder power, typically are used to correct for astigmatism. For toric lenses, the cylinder power is along the cylinder radius, which is orthogonal to the cylinder axis. The cylinder power of the toric lens results in the eye focusing light rays at a common focal point.

As indicated above, toricity is used to correct astigmatism so that it focuses light rays at a common point. However, the common focal point may be located at an incorrect position with respect to the retina. This condition is referred to as either "myopia" or "hyperopia". Myopia typically results from a steep cornea that causes light rays to focus at a focal point that is short of the retina. Conversely, hyperopia is a case in which a flat cornea causes light rays to focus at a focal point that is behind the retina. Sphere power is included in a lens to cause light to properly focus on the retina.

Contact lenses may include either or both spherical correction or cylinder correction depending on the particular circumstances of the lens wearer's eyes. Lenses that have only spherical correction are spherically symmetric, and thus, any rotation of the lens on the eye has no effect and does not disturb the intended vision correction. Toric lenses, on the other hand, are typically designed to include areas of different thickness, resulting in a spherically asymmetric lens. As a result, toric contact lenses need to be rotationally stabilized in the eye to insure that the lens is properly oriented with respect to the eye in order to carry out its function of correcting the vision particular areas of the eye.

Rotational stability may be achieved using a number of designs including inferior truncation, double truncation, thin zones (also called "double slab-off"), back surface toricity and prism wedge profile. These rotation stabilizing designs may be used individually or in combination. One common feature of these rotation stabilizing designs is the use of different thickness areas in the lens to achieve rotational stability. For example, in the case of a "slab off" design, the top and bottom portions of the lens are thinned out such that when they are positioned under the eyelids they are held in place by the lids. At the same time, the thicker portions of the lens are positioned in between the eyelids where they too are held in place by abutting against the eyelids.

The process for manufacturing differential thickness lenses typically includes a curing step, which may involve UV, heat, or other similar curing process. However, as a result of the curing step, the material of the lens shrinks at different rates due to the differential thicknesses. This differential shrinkage results in an angular offset of the cylinder axis of the lens.

SUMMARY OF THE INVENTION

The present invention is for a differential thickness contact lens that is compensated for differential shrinkage during the manufacturing process. The present invention is also for a method and apparatus for manufacturing and compensating a differential thickness lens for differential shrinkage during the manufacturing process. The angular offset of the cylinder axis due to differential shrinkage is compensated for by introducing an equal and opposite offset during the manufacturing process. The axis offset caused by a particular manufacturing process is experimentally determined, i.e., for each intended cylinder axis, the corresponding offset (in terms of degrees of rotation) is determined. The lens compensation is implemented by adjusting the manufacturing process so that upon curing the lens corresponds to the desired prescribed lens, without any axis offset.

DETAILED DESCRIPTION OF THE INVENTION

Figure 1:
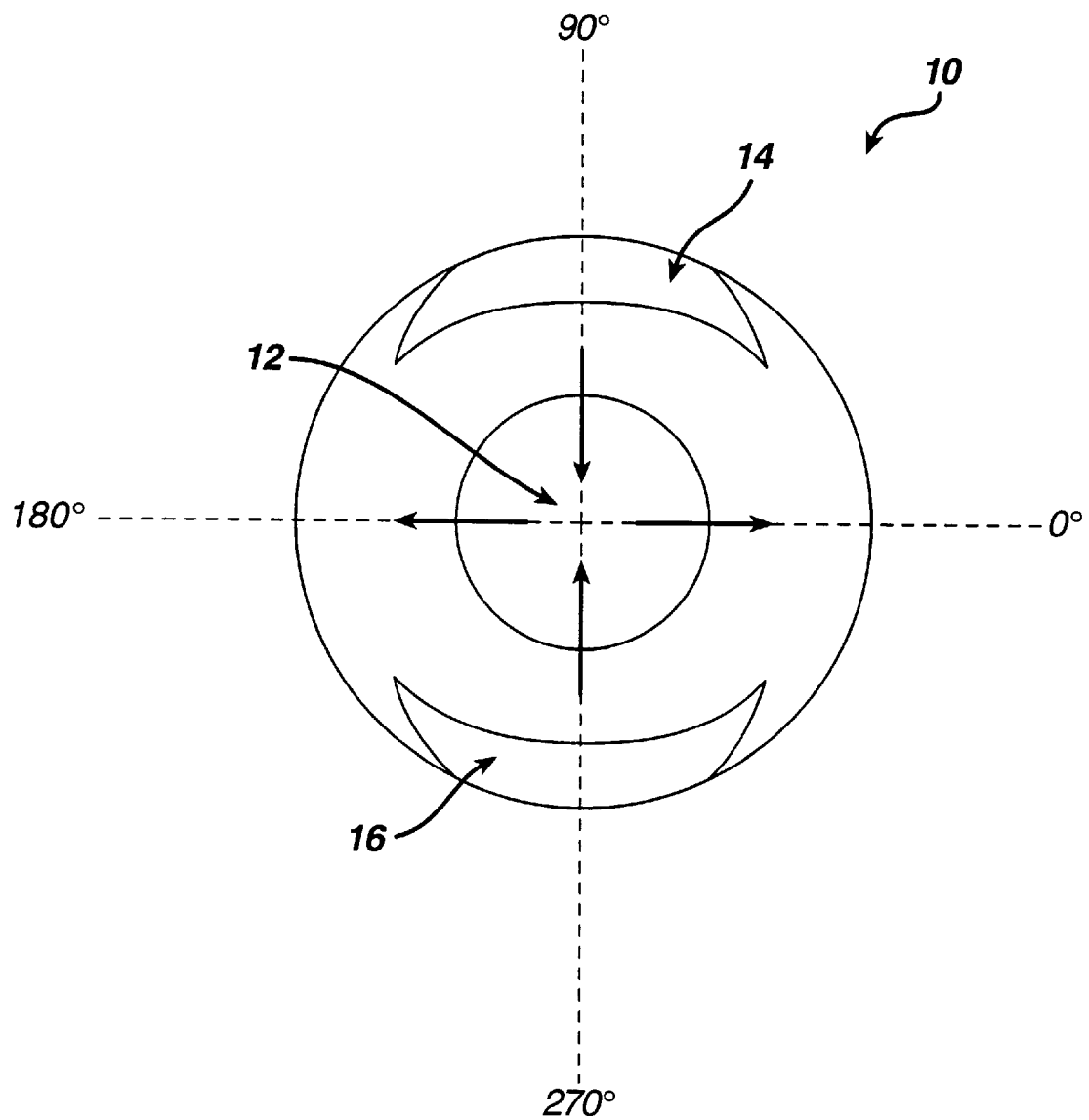
FIG. 1 is an illustration of a toric contact lens.

Referring to the drawings in detail, FIG. 1 illustrates a plan view of the front surface of a contact lens 10 having a rotationally stable design. The lens 10 includes a central optical zone 12, as well as thinned out areas 14 and 16 located at the upper and bottom regions, respectively, and intended to be positioned under the patient's eyelids.

Figure 2:
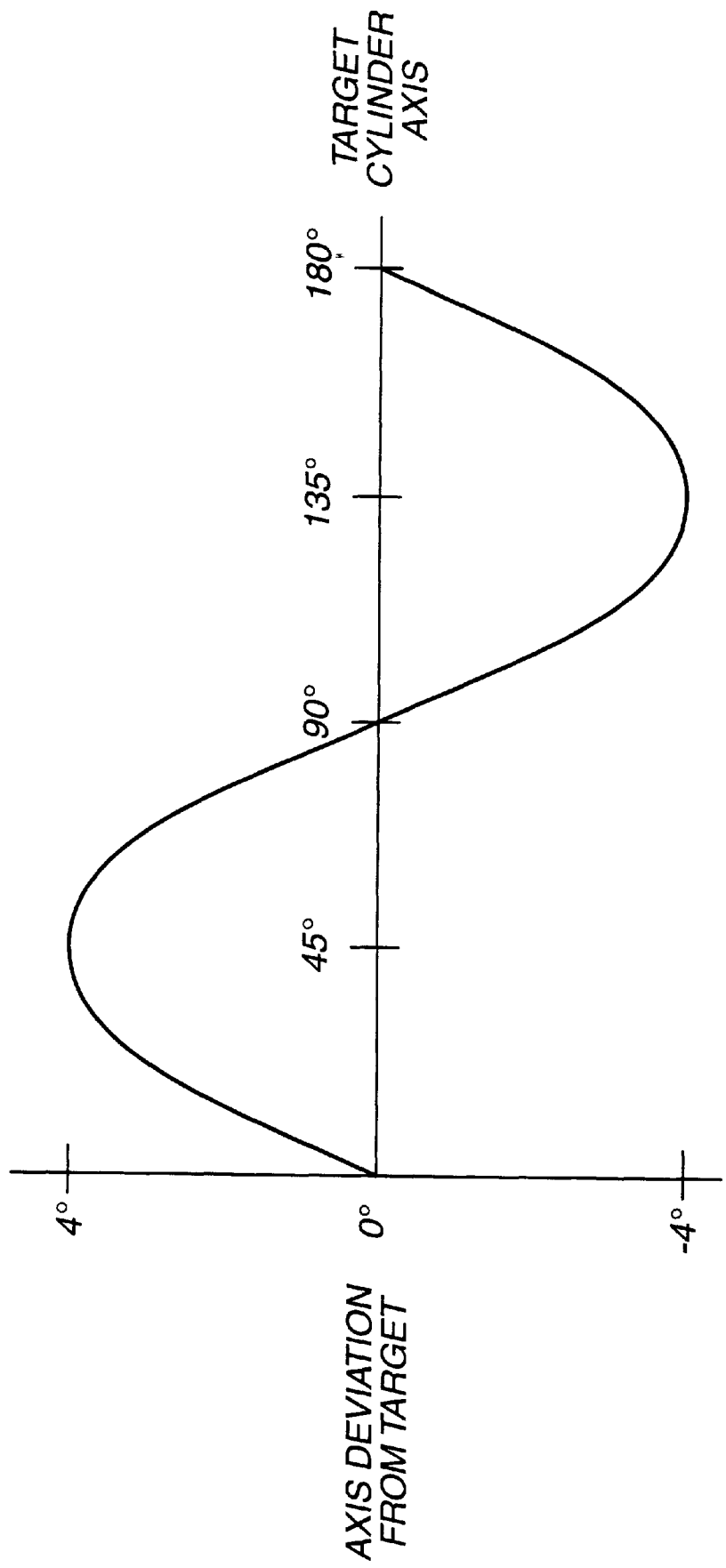
FIG. 2 is a graph of cylinder axis deviation from target as a function of cylinder axis position.

It has been observed that a lens having areas of different thickness changes its geometry during the curing step in the manufacturing process. Curing brings about a differential shrinkage that has an effect on the angular position of the cylinder axis, i.e., the cylinder axis is angularly offset by a certain amount. Referring now to FIG. 2, therein is shown a graph illustrating experimentally accumulated data for a particular lens design indicating the amount of angular offset as a function of the position of the cylinder axis. As shown in FIG. 2, a target cylinder axis of 45 degrees will have an offset of four degrees, such that the final cylinder axis will be 49 degrees. Conversely, an intended cylinder axis of 135 degrees will have an offset of −4 degrees, such that the final cylinder axis will be 131 degrees. In this example, due to the inherent symmetry about the 90 and 180 degree axes, lenses with intended axes of 90 and 180 degrees will experience no axis offset.

Figure 3:
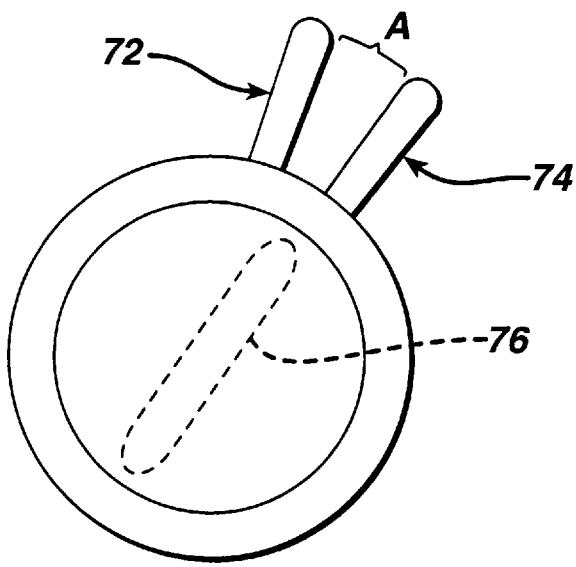
FIG. 3 is an illustration of offset molds used to compensate for axis deviation.

One method of manufacturing contact lenses is to use a front curve mold and a back curve mold, with each respective mold defining the particular features for the respective side of the lens. The lens is then molded and formed by the space defined in between the front curve and back curve molds. FIG. 3 illustrates one embodiment of the present invention which compensates for axis offset by adjusting one or both of the front curve and back curve molds. As shown in FIG. 3, front curve mold 72 and back curve mold 74 are rotated relative to each other by an amount "A" which is known to be the axis offset for the particular cylinder axis 76 which is desired to be molded.

Figure 4:
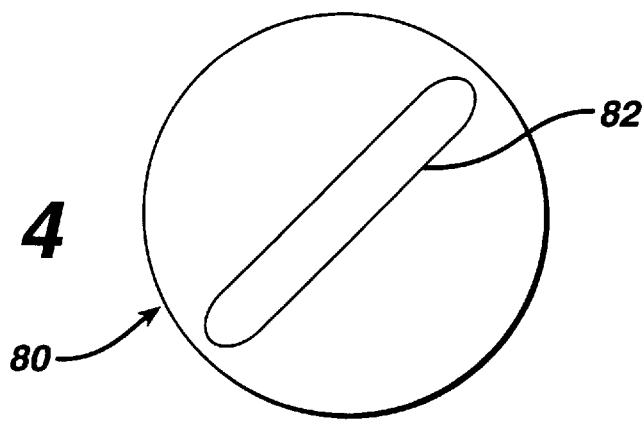
FIG. 4 is a top view illustration of an insert for a mold used to compensate for axis deviation.

FIG. 4 illustrates an alternative embodiment of the present invention which compensates for axis offset. Specifically, FIG. 4 illustrates an insert 80 which is used to make a mold for molding a lens. The insert 80 is processed such that the intended cylinder axis 82 defined by the insert is offset by the required offset. Thus, in the case of a 45 degree cylinder axis, the insert 80 is manufactured to have a cylinder axis 82 which is set at 41 degrees. The mold resulting from insert 80 will be used in conjunction with an opposite face mold to produce the final lens. According to this embodiment, the front and back molds do not need to be rotated as in the previous embodiment, since the mold already includes compensation for the anticipated axis offset. The resulting lens will have the intended cylinder axis of 45 degrees.

Figure 5:
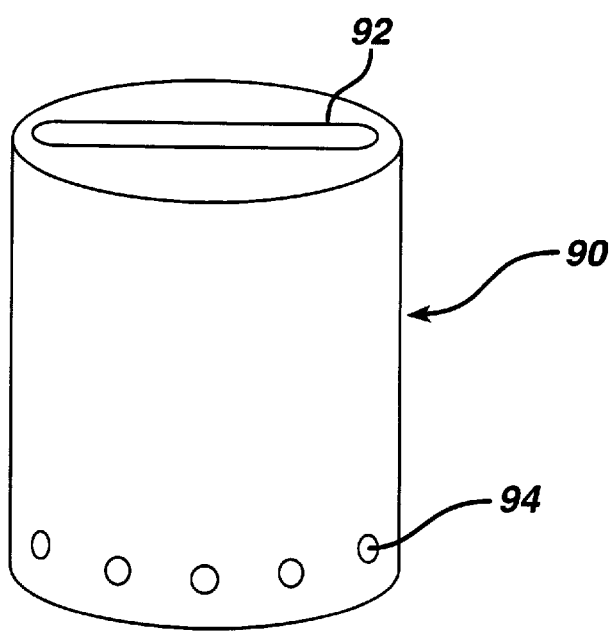
FIG. 5 is an illustration of an insert for a mold with selectable axis rotation.

FIG. 5 illustrates yet another alternative embodiment of the present invention which compensates for axis offset. Specifically, FIG. 5 illustrates an insert 90 for a mold. The insert is provided with the desired cylinder axis 92 which it is desired to mold. More important, the insert 90 is provided with a number of holes 94 which are spaced along the circumference of the insert 90. The holes 94 are used to orient the insert in a particular direction which compensates for the anticipated axis offset associated with the particular cylinder axis 92. In use, the insert is oriented to provide the desired cylinder axis. Then, using the holes 94, the insert 90 is rotated by the required amount of angular offset. The holes 94 may be used in conjunction with orienting pins (not shown) or other positioning mechanism. The advantage of the insert 90 is that a single insert may be used to provide a number of different cylinder axis molds, and corresponding offsets, all by rotating a single mold, i.e., selecting the desired amount of offset rotation.

The present invention may be utilized in the production of soft or hard contact lenses, but preferably is used in the production of soft contact lenses. More preferably the invention is used in the production of hydrogel lenses or silicone-containing hydrogel lenses. Many variations of the present invention will suggest themselves to those skilled in the art in light of the above, detailed description. All such variations are within the scope of the invention as set forth in the appended claims.

What is claimed is:

1. A method of producing a toric contact lens, comprising the following steps:
designing a toric contact lens having a first area of a first thickness, a second area of a second thickness, and a cylinder axis, said first and second areas being of different thickness,
determining an amount of cylinder axis offset for said cylinder axis due to differential shrinkage of said lens;
adjusting the manufacturing process to modify said cylinder axis in amount substantially equal and opposite to said cylinder axis offset.

2. The method of claim 1, wherein said adjusting step comprises the following step:
adjusting the relative position of a front curve mold and a back curve mold such that said front curve mold and said back curve mold are offset by an amount substantially equal to the cylinder axis offset.

3. The method of claim 2, wherein the step of adjusting the relative position includes the step of rotating one or both of said front curve mold and said back curve mold.

4. The method of claim 1, wherein said adjusting step includes the step of modifying an insert used to make a mold for molding said lens, said modifying step including the step of shifting the angular position of the cylinder axis formed by said mold.

5. The method of claim 4, wherein the angular position of the cylinder axis formed by said mold is shifted by an amount substantially equal to said cylinder axis offset.

6. The method of claim 5, wherein said mold is one of a front curve mold and a back curve mold.

7. The method of claim 1, wherein said adjusting step includes the following steps:
providing an insert for a mold, said insert having a plurality of selectable insert orientation means;
selecting one of said insert orientation means such that the angular position of the cylinder axis formed by said mold produced by said insert is shifted by an amount substantially equal to said cylinder axis offset.

8. The method of claim 7, wherein said mold is one of a front curve mold and a back curve mold.

9. The method of claim 7, wherein said plurality of selectable insert orientation means includes a plurality of openings circumferentially placed along a perimeter of said insert, and an orientation selection means comprising a pin for engaging the selected insert orientation means.

10. The method of claim 9, wherein the openings are equally spaced along said perimeter.

11. The method of claim 9, wherein the openings are unequally spaced along said perimeter.

12. The method of claim 1, wherein the toric contact lens is a hydrogel lens.

13. The method of claim 1, wherein the toric contact lens is a silicone-containing hydrogel lens.

14. A toric contact lens produced in accordance with the method of claim 1.

15. The toric contact lens of claim 14, wherein the lens is a hydrogel lens.

16. The toric contact lens of claim 14, wherein the lens is a silicone-containing hydrogel lens.

17. An apparatus for producing a toric contact lens having a first area of a first thickness, a second area of a second thickness, and a cylinder axis, said first and second areas being of different thickness, said lens having a cylinder axis offset due to differential shrinkage of said lens, the apparatus comprising:
an adjustment mechanism for adjusting the manufacturing process to modify said cylinder axis in amount substantially equal and opposite to said cylinder axis offset, said adjustment mechanism including
an insert for a mold, said insert having a plurality of selectable insert orientation means;
means for selecting one of said insert orientation means such that the angular position of the cylinder axis formed by said mold produced by said insert is shifted by an amount substantially equal to said cylinder axis offset.

\* \* \* \* \*